UNITED STATES PATENT OFFICE.

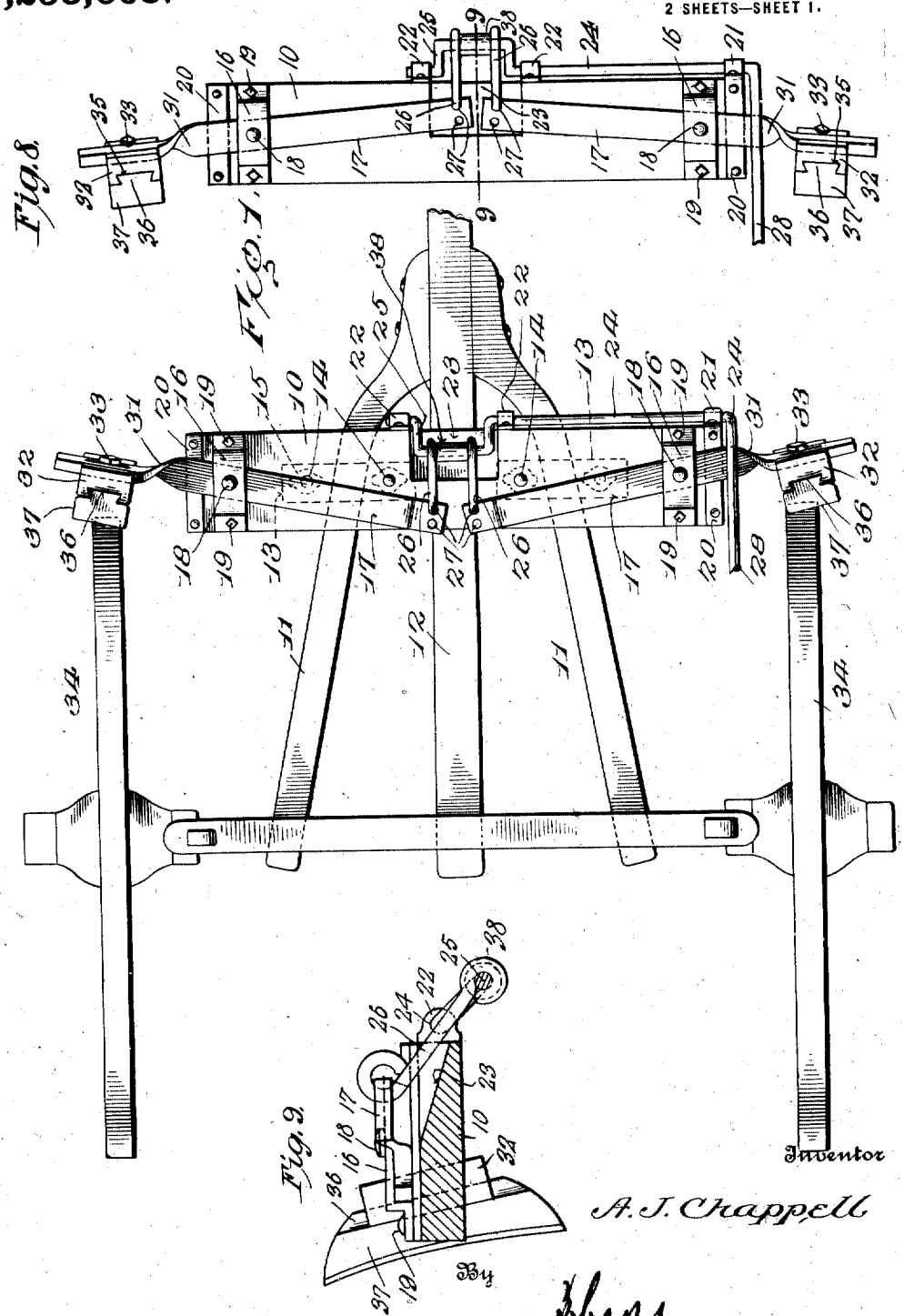

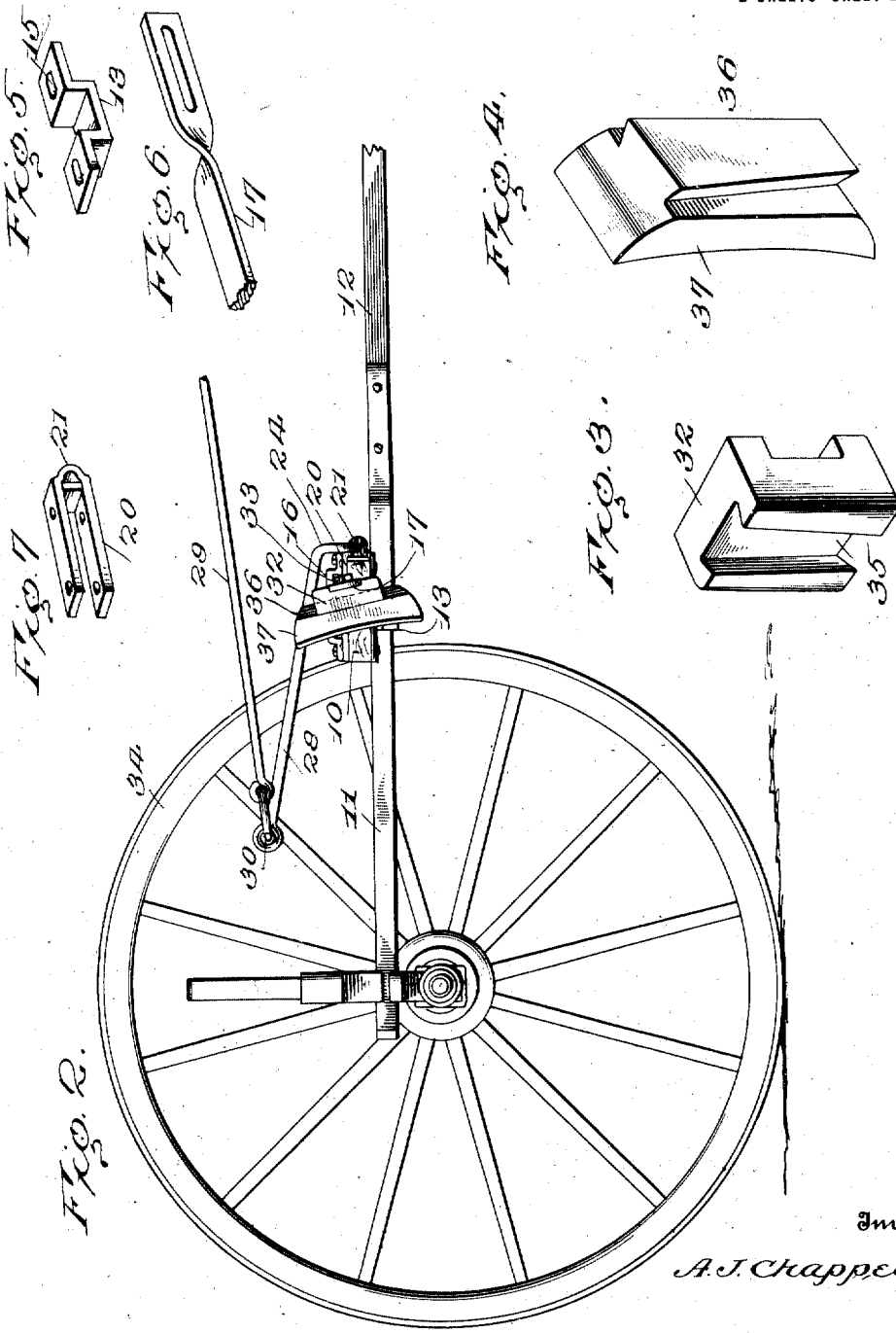

ANDREW J. CHAPPELL, OF SAMANTHA, ALABAMA.

VEHICLE-BRAKE.

1,253,668.                     Specification of Letters Patent.      Patented Jan. 15, 1918.

Application filed March 9, 1917.   Serial No. 153,730.

*To all whom it may concern:*

Be it known that I, ANDREW J. CHAPPELL, a citizen of the United States, residing at Samantha, in the county of Tuscaloosa and State of Alabama, have invented certain new and useful Improvements in Vehicle-Brakes, of which the following is a specification.

This invention relates to improvements in vehicle brakes, more particularly to the brakes employed upon farm wagons, freight wagons, and the like, and has for one of its objects to provide a simply constructed device which may be applied without material structural change to the running gear portions of the vehicle, and adjusted to fit running gears of various forms and sizes.

With these and other objects in view, the invention consists in certain novel features of construction, as hereinafter shown and described and then specifically pointed out in the claims; and in the drawings illustrative of the preferred embodiment of the invention—

Figure 1 is a plan view of a portion of the running gear of a vehicle including the rear axle and the rear wheels, a portion of the reach, and the rear axle hounds, with the improved device applied thereto and with the brake shoes released.

Fig. 2 is a side elevation of the parts shown in Fig. 1 with the nigh wheel removed.

Fig. 3 is an enlarged detached perspective view of one of the brake blocks.

Fig. 4 is an enlarged detached perspective view of one of the brake shoes.

Fig. 5 is a detached perspective view of one of the keepers of the support.

Fig. 6 is a detached perspective view of the end portion of one of the brake operating levers.

Fig. 7 is a detached perspective view of one of the combined wear plates and rock shaft bearings.

Fig. 8 is a plan view of the improved device detached, with the parts arranged to show the brake shoes applied;

Fig. 9 is a cross section, enlarged, on the line 9—9 of Fig. 8.

Corresponding and like parts are referred to in the following description and indicated in all the views of the drawings by the same reference characters.

The improved device comprises a supporting body, represented as a whole at 10, and preferably formed from a wood plank of sufficient strength to support the brake mechanism and disposed transversely of the rear axle hounds 11 and the reach 12. Keeper devices 13 are attached to the under face of the member 10 and inclose the hound members 11. The keeper members 13 are secured in position upon the member 10 by clamp bolts 14, the members 13 being slotted, as indicated at 15, where the bolts 14 pass through, to enable the keeper devices to be adjusted to correspond to varying distances between the hounds. By this means the member 10 may be adjusted to fit different sizes and forms of hounds.

Attached to the upper face of the member 10 near its ends are keeper devices 16 in which lever arms 17 are pivoted at 18. The keeper devices 16 are each formed of two coacting plates, one bearing directly upon the member 10 and the other in arching form and extending over the lever members, the holding bolts 19 of the keeper devices operating through the terminals of both portions of the keeper and securing the same firmly to the member 10. Wear plates 20 are attached to the upper face of the member 10 at the ends and over which the outer portions of the levers operate to prevent wear of the member 10.

The lever members 17 are preferably formed of metal bars in flat form transversely, and the portion of each bar externally of the keepers 16 is formed with a quarter twist, as shown at 31, to dispose the outer portions of the levers substantially vertical transversely, as shown in Fig. 1, the vertically disposed portions being slotted longitudinally. The brake blocks are represented at 32 and each provided with a transverse seat to receive the vertically disposed portion of the member 17, and secured in position by a clamp bolt 33, the slots in the outer portion of the member 17 providing for the adjustment of the brake blocks longitudinally of the lever members, to enable the brake device to be adapted to varying distances between the traction wheels 34. At its forward edge each brake block is provided with a dovetailed channel, indicated at 35, to receive a dovetailed projection 36, on a brake shoe 37, the channel or seat 35 and the projection 36 being slightly tapered to hold the shoes in position. The shoes 37 are formed with an inwardly curving face corresponding to the curvature of the wheels 34.

One of the members 20 is extended to form a bearing 21, opposite the forward edge of the member 10, while similar bearings 22 are also attached to the forward edge of the member 10 and in spaced relation with each other and spaced from the bearing 20. The member 10 is provided with a recess indicated at 23, and mounted for rotation through the bearings 21 and 22 is a shaft 24 having a crank 25 between the bearings 22 and extending, when in one position, within the recess 23. Link devices 26 are connected at one end to the crank 25 and at their other ends to the confronting ends of the lever member 17, as shown at 27, and when the crank 25 is reversed in position to move the lever member 17 for disposing the shoes in operative position, the rods 26 will enter the recess 23 as shown in Fig. 9, and hold the levers with the shoes bearing against the wheels 34. The shaft 24 is extended laterally at one end into a relatively long lever arm 28 to which a suitable pull device, indicated at 29, is loosely coupled by a ring 30. The member 28 extends rearwardly of the vehicle and is disposed obliquely to the longitudinal plane of the reach and hounds, as illustrated in Fig. 2.

By this arrangement it will be obvious that when the member 28 is disposed in its rearward position as shown in Figs. 1 and 2, the crank 25 will likewise be disposed in its rearward position and hold the contiguous ends of the lever member 17 in their rearward position with the brake shoes in their inoperative position, or spaced from the wheels 34. When the brake is to be actuated the pull member 29 is moved forwardly and the member 28 moved into its upward and forward position, thus causing the crank 25 through the coaction of the links 26 to move the brake shoes into engagement with the wheels 34. The pivot devices 18 are located nearer the outer end of the lever 17 than their inner ends, consequently the crank 25 when actuated produces a strong leverage action to apply the brake shoes effectually. So that a comparatively light pulling force exerted upon the member 29 will produce a strong pressure against the brake shoes, and correspondingly increase the power of the brake.

The improved device including the member 10 and its attachments are complete within themselves and form a brake applying device which may be readily adapted to vehicles of various sizes and forms without material change, by simply adjusting the keeper devices 13 to adapt the attaching means of the member 10 to the hounds or to other portions of the running gear, and likewise to adjust the brake blocks 32 to adapt the brake devices to wheels spaced at various distances apart.

Any suitable means may be employed for actuating the member 29, but preferably the latter will be extended to a point convenient to the hand of the driver upon the seat of the vehicle, not shown, in the usual position of brake applying devices.

The member 10 will generally be of wood, while the remaining portions are of metal of sufficient strength to withstand the strains to which the device will be subjected when in use.

The crank 25 is surrounded by a sleeve 38 to maintain the links 26 in spaced relation.

Having thus described the invention, what is claimed as new is—

1. A brake device comprising a support adapted to be attached to the running gear of a vehicle and having an upwardly and rearwardly opening recess, lever devices pivoted intermediate their ends to said support and movable at their inner ends over said recess, brake shoes connected at their outer ends to said lever device in position to engage the wheels of the vehicle, a rock shaft supported upon said support and having a crank located opposite said recess, links connecting said crank to said lever devices and movable into said recess when the crank is disposed in one position, whereby when said crank is actuated the brake shoes will be applied to the wheels and held in locked position.

2. A brake device comprising a support adapted to be attached to the running gear of a vehicle and having an upwardly and rearwardly opening recess, lever devices pivoted intermediate their ends to said support and movable at their inner ends over said recess, brake shoes connected at their outer ends to said lever device in position to engage the wheels of the vehicle, a rock shaft supported upon said support and having a crank located opposite said recess, links in spaced relation and connected at one end respectively to said lever devices and at their other ends to said crank, and a spacer sleeve engaging said crank between said links.

In testimony whereof I affix my signature.

ANDREW J. CHAPPELL. [L. S.]

Copies of this patent may be obtained for five cents each, by addressing the "Commissioner of Patents, Washington, D. C."